US009819193B2

(12) United States Patent
Abe

(10) Patent No.: US 9,819,193 B2
(45) Date of Patent: Nov. 14, 2017

(54) WASTE HEAT RECOVERY SYSTEM

(71) Applicant: ISUZU MOTORS LIMITED, Tokyo (JP)

(72) Inventor: Makoto Abe, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 8 days.

(21) Appl. No.: 15/031,065

(22) PCT Filed: Feb. 2, 2015

(86) PCT No.: PCT/JP2015/052869
§ 371 (c)(1),
(2) Date: Apr. 21, 2016

(87) PCT Pub. No.: WO2015/119081
PCT Pub. Date: Aug. 13, 2015

(65) Prior Publication Data
US 2016/0254674 A1    Sep. 1, 2016

(30) Foreign Application Priority Data
Feb. 7, 2014 (JP) .................... 2014-022158

(51) Int. Cl.
*F02D 25/00* (2006.01)
*H02J 3/46* (2006.01)
(Continued)

(52) U.S. Cl.
CPC .................. *H02J 3/46* (2013.01); *F01K 5/00* (2013.01); *F01K 5/02* (2013.01); *F01K 7/16* (2013.01); *F02G 5/02* (2013.01); *Y02T 10/166* (2013.01)

(58) Field of Classification Search
USPC .................... 290/4 D; 60/645, 650, 660, 671
See application file for complete search history.

(56) References Cited

U.S. PATENT DOCUMENTS 4,437,316 A * 3/1984 Dyer .................... B01D 1/2884
62/238.4
6,598,397 B2 * 7/2003 Hanna ..................... F01K 17/02
60/651
(Continued)

FOREIGN PATENT DOCUMENTS

CN    102422006 A    4/2012
CN    102422007      4/2012
(Continued)

OTHER PUBLICATIONS

International Search Report dated Apr. 28, 2015, in corresponding International Application No. PCT/JP2015/052869.

*Primary Examiner* — Pedro J Cuevas
(74) *Attorney, Agent, or Firm* — Staas & Halsey LLP

(57) ABSTRACT

Connected in parallel to an expander and a condenser of a Rankine cycle are n sets each including a different expander and a different condenser. Devices are provided for stopping operations of the expanders in sets connected in parallel, and a pressure sensor and a temperature sensor are installed respectively in an inlet and outlet of an evaporator. An electronic control unit sets or releases at least one of the operation stopping devices such that a measured value of the temperature sensor reaches a prescribed temperature value which is equal to or less than a thermal decomposition temperature of a refrigerant and which is set in advance, and the electronic control unit controls a rotational speed of a refrigerant pump such that a measured value of the pressure sensor reaches a prescribed pressure value set in advance.

2 Claims, 1 Drawing Sheet

(51) Int. Cl.
  *F01K 5/02*    (2006.01)
  *F01K 7/16*    (2006.01)
  *F02G 5/02*    (2006.01)
  *F01K 5/00*    (2006.01)
  *F01K 13/02*   (2006.01)
  *F01K 25/02*   (2006.01)

(56) References Cited

U.S. PATENT DOCUMENTS

| | | | | |
|---|---|---|---|---|
| 7,458,218 B2 * | 12/2008 | Kalina | F01K 25/065 | 60/649 |
| 7,971,449 B2 * | 7/2011 | Peterson | B60H 1/3204 | 62/116 |
| 8,069,687 B2 * | 12/2011 | Jork | C09K 5/047 | 62/476 |
| 8,752,378 B2 * | 6/2014 | Ernst | F01K 23/065 | 60/286 |
| 8,776,517 B2 * | 7/2014 | Ernst | F01K 9/04 | 60/39.182 |
| 9,518,497 B2 * | 12/2016 | Tricaud | F01N 5/02 | |
| 9,676,484 B2 * | 6/2017 | Vaisman | B64D 13/08 | |
| 2003/0029169 A1 * | 2/2003 | Hanna | F01K 17/02 | 60/651 |
| 2004/0083732 A1 * | 5/2004 | Hanna | F01K 17/02 | 60/651 |
| 2004/0226296 A1 * | 11/2004 | Hanna | F01K 17/02 | 60/671 |
| 2008/0000225 A1 * | 1/2008 | Kalina | F01K 25/065 | 60/517 |
| 2008/0006040 A1 * | 1/2008 | Peterson | B60H 1/3204 | 62/116 |
| 2008/0135253 A1 * | 6/2008 | Vinegar | C10G 1/02 | 166/302 |
| 2008/0173450 A1 * | 7/2008 | Goldberg | E21B 36/04 | 166/302 |
| 2009/0277400 A1 | 11/2009 | Conry | | |
| 2010/0095703 A1 * | 4/2010 | Jork | C09K 5/047 | 62/476 |
| 2010/0146973 A1 * | 6/2010 | Kalina | F01K 7/22 | 60/653 |
| 2010/0205962 A1 * | 8/2010 | Kalina | F01D 15/10 | 60/641.8 |
| 2010/0263380 A1 * | 10/2010 | Biederman | F01K 23/065 | 60/651 |
| 2010/0287934 A1 * | 11/2010 | Glynn | F01K 17/06 | 60/645 |
| 2010/0288571 A1 * | 11/2010 | Dewis | B60K 3/04 | 180/165 |
| 2011/0005477 A1 * | 1/2011 | Terashima | F01K 23/065 | 123/41.51 |
| 2011/0094485 A1 * | 4/2011 | Vuk | F01N 5/04 | 123/568.21 |
| 2011/0209473 A1 * | 9/2011 | Fritz | F01K 23/065 | 60/605.2 |
| 2011/0314805 A1 * | 12/2011 | Seale | F01K 17/06 | 60/522 |
| 2012/0023946 A1 * | 2/2012 | Ernst | F01K 9/04 | 60/660 |
| 2012/0036850 A1 * | 2/2012 | Ernst | F01K 23/065 | 60/615 |
| 2012/0036860 A1 * | 2/2012 | Wettstein | F02C 1/08 | 60/772 |
| 2012/0090321 A1 | 4/2012 | Gärtner et al. | | |
| 2012/0128463 A1 * | 5/2012 | Held | F01K 23/10 | 415/1 |
| 2012/0131918 A1 * | 5/2012 | Held | F01K 3/185 | 60/645 |
| 2012/0131919 A1 * | 5/2012 | Held | F01K 13/02 | 60/646 |
| 2012/0131920 A1 * | 5/2012 | Held | F01K 13/02 | 60/650 |
| 2012/0131921 A1 * | 5/2012 | Held | F01K 25/08 | 60/671 |
| 2012/0192560 A1 * | 8/2012 | Ernst | F01K 23/065 | 60/616 |
| 2013/0160447 A1 * | 6/2013 | Kontomaris | F01K 23/00 | 60/645 |
| 2013/0234439 A1 * | 9/2013 | Mirmobin | F23D 14/12 | 290/52 |
| 2014/0026574 A1 * | 1/2014 | Leibowitz | F01K 25/08 | 60/651 |
| 2014/0033711 A1 * | 2/2014 | Leibowitz | F01K 25/08 | 60/645 |
| 2014/0174084 A1 * | 6/2014 | Kontomaris | F01K 25/10 | 60/651 |
| 2014/0260341 A1 * | 9/2014 | Vaisman | B64D 13/08 | 62/56 |
| 2015/0027118 A1 * | 1/2015 | Tricaud | F01N 5/02 | 60/624 |
| 2015/0052896 A1 | 2/2015 | Ono | | |
| 2015/0152749 A1 * | 6/2015 | Nishiguchi | C09K 5/045 | 60/651 |
| 2015/0337689 A1 * | 11/2015 | Leibowitz | F01K 25/08 | 60/645 |
| 2016/0047540 A1 * | 2/2016 | Aumann | B01F 5/0485 | 60/651 |
| 2016/0223234 A1 * | 8/2016 | Vaisman | F25B 45/00 | |
| 2017/0219253 A1 * | 8/2017 | Vaisman | F24J 2/055 | 126/653 |

FOREIGN PATENT DOCUMENTS

| | | | | |
|---|---|---|---|---|
| EP | 2 455 658 A1 * | 5/2012 | | F22B 35/00 |
| JP | 2008-175108 | 7/2008 | | |
| JP | 2012-051060 * | 4/2013 | | F25B 25/02 |
| JP | 2013-184566 | 9/2013 | | |
| WO | WO 2012/065734 A1 * | 5/2012 | | F22B 35/00 |

* cited by examiner

[Fig 1]
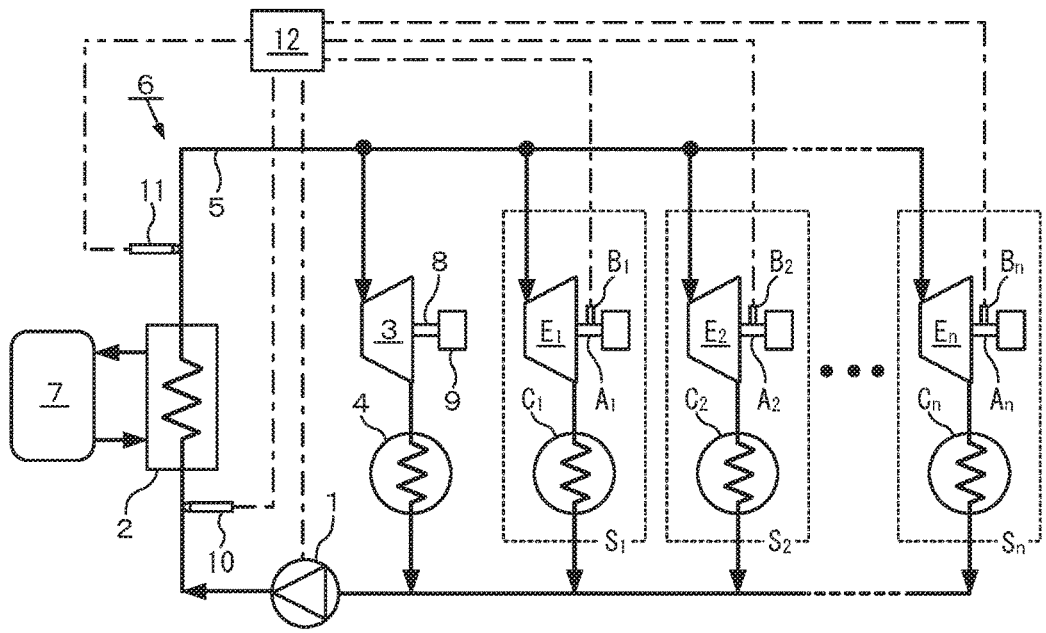
[Fig 2]
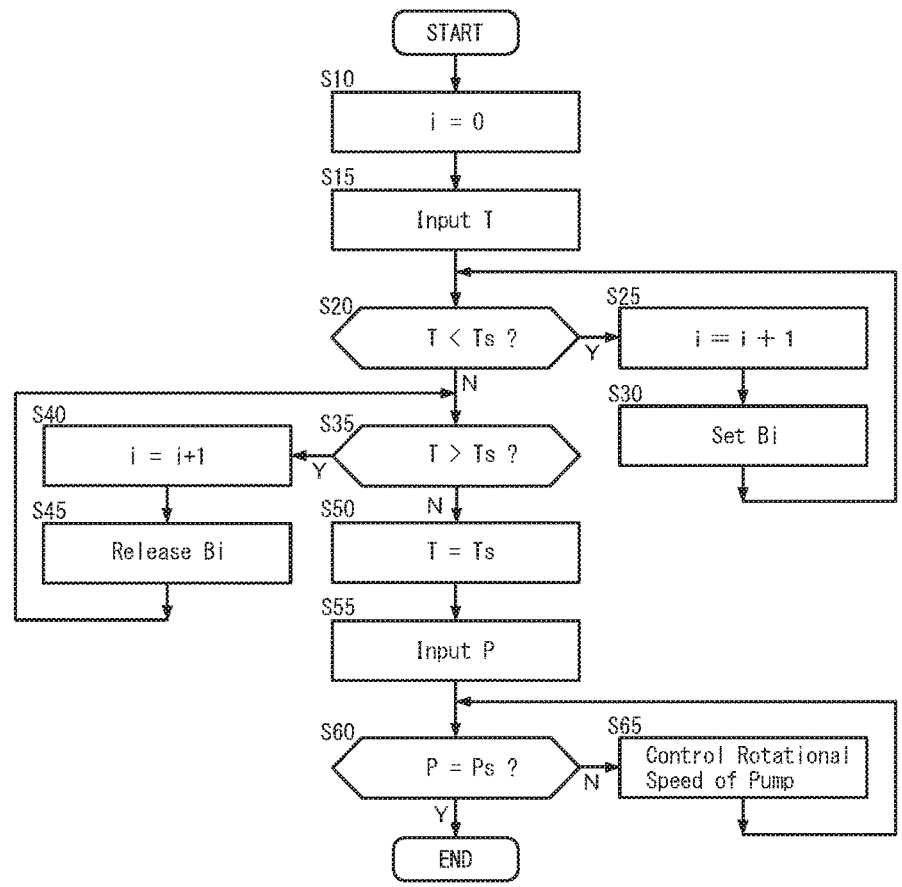

WASTE HEAT RECOVERY SYSTEM

CROSS-REFERENCE TO RELATED APPLICATIONS

This application is a U.S. National Stage Application, which claims the benefit under 35 U.S.C. §371 of PCT International Patent Application No. PCT/JP2015/052869, filed Feb. 2, 2015 which claims the foreign priority benefit under 35 U.S.C. §119 of Japanese Patent Application No. 2014-022158, filed Feb. 7, 2014, the contents of which are incorporated herein by reference.

TECHNICAL FIELD

The present invention relates to a waste heat recovery system, or more specifically, to a waste heat recovery system which recovers waste heat from an internal combustion engine at high efficiency without causing thermal decomposition of a refrigerant in a Rankine cycle.

BACKGROUND ART

As described in Japanese patent application Kokai publication No. Hei 11-51582 (Patent Document 1), use of a Rankine cycle has heretofore been proposed to reduce fuel consumption by recovering waste heat from an internal combustion engine. In order to efficiently operate the Rankine cycle, it is necessary to adjust an evaporation temperature of a refrigerant by changing a pressure thereof. A fluorocarbon-based refrigerant used in a waste heat recovery Rankine cycle gasifies at a low temperature, and therefore has a feature that the refrigerant set at an appropriate pressure allows a Rankine cycle to operate with a heat source at a low temperature equal to or less than 100° C. On the other hand, this technique has a drawback that it is not possible to make the temperature of the refrigerant higher than its thermal decomposition temperature.

During recovery of waste heat of exhaust gas from an internal combustion engine of an automobile or the like, the temperature of the exhaust gas varies significantly in a range from 100° C. to 800° C. depending on a driving condition. Further, when the temperature of the exhaust gas is high, an exhaust gas flow rate also increases in proportion thereto. As a consequence, an amount of waste heat also becomes very large. In the meantime, regarding waste heat from cooling water in the internal combustion engine, the temperature of the cooling water varies less significantly in a range from 80° C. to 100° C., whereas an amount of the waste heat varies significantly.

In the case of recovering the waste heat whose amount of heat varies significantly as described above, a flow rate of the refrigerant should be changed appropriately in order to maintain the temperature of the refrigerant in the Rankine cycle at the evaporation temperature, which is equal to or less than the thermal decomposition temperature and is under a pressure that enables efficient operation.

However, in the conventional structure of the waste heat recovery Rankine cycle provided with one expander and one pump only, it has been difficult to change the flow rate of the refrigerant in such a way as to maintain a constant temperature while keeping the pressure at a prescribed value.

PRIOR ART DOCUMENT

Patent Document 1: Japanese patent application Kokai publication No. Hei 11-51582

SUMMARY OF THE INVENTION

An object of the present invention is to provide a waste heat recovery system, which is capable of recovering waste heat from an internal combustion engine at high efficiency without causing thermal decomposition of a refrigerant in a Rankine cycle.

A waste heat recovery system according to the present invention which achieves the above object includes: a Rankine cycle in which a refrigerant circulates in a refrigerant pump, an evaporator, an expander, and a condenser in sequence; and a controller for controlling the Rankine cycle, in which the waste heat recovery system is designed to use waste heat from an internal combustion engine as a heating source for the evaporator. The waste heat recovery system includes: a set including the expander and the condenser and at least one different set including a different expander and a different condenser are connected in parallel with each other; at least one operation stopping device is provided for stopping an operation of the expander in the different set connected in parallel; a pressure sensor is installed in an inlet of the evaporator and a temperature sensor is installed in an outlet of the evaporator; the controller sets or releases at least one of the operation stopping device such that a measured value of the temperature sensor reaches a prescribed temperature value which is set in advance and is equal to or less than a thermal decomposition temperature of the refrigerant; and the controller controls a rotational speed of the refrigerant pump such that a measured value of the pressure sensor reaches a prescribed pressure value which is set in advance.

According to the waste heat recovery system of the present invention, multiple expanders and condensers as in the conventional Rankine cycle are connected in parallel so that flow passage or passages can be appropriately selected depending on the temperature of the refrigerant, and the temperature of the refrigerant in the Rankine cycle can always be maintained at a temperature value equal to or less than the thermal decomposition temperature and under the pressure at which the refrigerant is operated at high efficiency even when an amount of waste heat from the internal combustion engine varies. Thus, it is possible to recover the waste heat from the internal combustion engine at high efficiency without causing thermal decomposition of the refrigerant in the Rankine cycle.

BRIEF DESCRIPTION OF THE DRAWINGS

FIG. 1 is a configuration diagram of a waste heat recovery system according to an embodiment of the present invention.

FIG. 2 is a flowchart describing contents of control by an electronic control unit ("ECU") in the waste heat recovery system according to the embodiment of the present invention.

DETAILED DESCRIPTION

Embodiments of the present invention will be described below with reference to the drawings. FIG. 1 shows a waste heat recovery system according to the embodiment of the present invention. Note that arrows in FIG. 1 show flowing directions of a fluid.

This waste heat recovery system is mounted on a vehicle such as a truck, provided with a Rankine cycle 6 in which a refrigerant 5 circulates in a refrigerant pump 1, an evaporator 2, an expander 3, and a condenser 4 in sequence, and is designed to recover waste heat from a diesel engine 7 which is an internal combustion engine.

Exhaust gas from the diesel engine 7, cooling water for an engine body, and the like are used as a heating source for the evaporator 2 in the Rankine cycle 6. On the other hand, cooling water for an intercooler, and the like are used as a cooling source for the condenser 4. Meanwhile, examples of the refrigerant 5 include water, ethanol, a fluorine compound, and the like.

The refrigerant 5 flowing through the Rankine cycle 6 is compressed in a liquid state by the refrigerant pump 1, and is then isobarically heated into a high-pressure gas by the evaporator 2. Thereafter, the refrigerant 5 rotatably drives an electric generator 9 through a turbine shaft 8 while being adiabatically expanded by the expander 3, and then returns into the liquid while being isobarically cooled by the condenser 4.

Moreover, connected in parallel to the expander 3 and the condenser 4 of the Rankine cycle 6 are n (n is a natural integer) sets S each of which includes a different expander E and a different condenser C having the same specifications as those of the expander 3 and the condenser 4. Meanwhile, provided to the expanders E1 to En in the sets S1 to Sn, respectively, are operation stopping devices B1 to Bn to be set or released so as to stop or activate operations of the expanders E1 to En. Although the operation stopping means B are not limited to particular devices, examples of the devices include brakes which apply mechanical loads to turbine shafts A of the expanders E. When the operation stopping device(s) Bn are set, the refrigerant 5 is kept from circulating in the corresponding set Sn.

Furthermore, a pressure sensor 10 configured to measure a pressure of the refrigerant 5 is installed on an inlet side of the evaporator 2 and a temperature sensor 11 configured to measure a temperature of the refrigerant 5 is installed on an outlet side thereof, respectively.

Each of the operation stopping devices B1 to Bn, the refrigerant pump 1, the pressure sensor 10, and the temperature sensor 11 described above is connected to an electronic controller, i.e., ECU 12, through a signal line (indicated with a chain dashed line).

Here, the number n of the sets S described above is appropriately determined based on specifications and operating conditions of the diesel engine 7, and performances of the refrigerant pump 1 and the evaporator 2.

Contents of control by the ECU 12 in the above-described waste heat recovery system will be described below based on FIG. 2.

The ECU initializes a control variable i (an integer) (S10). Then, the ECU inputs a measured value T of the temperature sensor 11 (S15), and either sets or releases at least one of the operation stopping devices B1 to Bn such that the measured value T reaches a prescribed temperature value Ts which is set in advance and is equal to or less than a thermal decomposition temperature of the refrigerant 5. The prescribed temperature value Ts is a temperature at which the refrigerant 5 is operated at high efficiency in the Rankine cycle 6, and which is determined based on the type of the refrigerant 5.

Specifically, when the measured value T is below the prescribed temperature value Ts (S20), an amount of waste heat from the diesel engine 7 is determined to be relatively small. Hence, the operation stopping devices B1 to Bn are set in sequence (S25 and S30) so as to cause the refrigerant 5 to flow either only through the conventional expander 3 as well as the conventional condenser 4, or only through an appropriate number of the sets S in addition thereto. On the other hand, when the measured value T is above the prescribed temperature value Ts (S35), the amount of waste heat from the diesel engine 7 is determined to be relatively large. Hence, the operation stopping devices B1 to Bn are released in sequence (S40 and S45) so as to cause the refrigerant 5 to flow through an appropriate number of the sets S in addition to the conventional expander 3 and the conventional condenser 4.

Then, when the measured value T is determined to be equal to the prescribed temperature value Ts (S50), a measured value P of the pressure sensor 10 is inputted (S55), and a rotational speed of the refrigerant pump 1 is controlled (S60 and S65) such that the measured value P reaches a prescribed pressure value Ps which is set in advance. The prescribed pressure value Ps is a pressure at which the refrigerant 5 is operated at high efficiency in the Rankine cycle 6, and which is determined based on the type of the refrigerant 5.

The steps 10 to 65 described above are repeated while the diesel engine 7 is in operation.

By performing the control as described above, the temperature of the refrigerant 5 in the Rankine cycle 6 is always maintained at the temperature value equal to or less than the thermal decomposition temperature and under the pressure at which the refrigerant 5 is operated at high efficiency even when the amount of waste heat from the diesel engine 7 varies. Thus, it is possible to recover the waste heat from the diesel engine 7 at high efficiency without causing thermal decomposition of the refrigerant 5.

The waste heat recovery system of the present invention can be mounted not only on a vehicle such as the above-mentioned truck, but also on a fixed power generator, a large-size electric generator, and the like. Meanwhile, the internal combustion engine is not limited only to the diesel engine 7.

The invention claimed is:

1. A waste heat recovery system, comprising:
   a Rankine cycle in which a refrigerant circulates in a refrigerant pump, an evaporator, a first expander, and a first condenser in sequence;
   an electronic controller for controlling the Rankine cycle, wherein the waste heat recovery system uses waste heat from an internal combustion engine as a heating source for the evaporator;
   a first set including the first expander and the first condenser;
   at least one separate second set including a second expander and a second condenser connected in parallel with the first set;
   at least one device for stopping an operation of the second expander;
   a pressure sensor at an inlet of the evaporator that measures a value of the pressure of the refrigerant; and
   a temperature sensor at an outlet of the evaporator that measures a value of the temperature of the refrigerant,
   wherein the electronic controller is configured to—
      set or release the at least one device for stopping the operation stopping devices based on the measured value of the temperature so that the measured value of the temperature reaches a prescribed temperature value which is set in advance and which is equal to or less than a thermal decomposition temperature of the refrigerant, and
      when the detected measured value of the temperature is determined to be equal to the prescribed temperature, control a rotational speed of the refrigerant pump, based on the measured value of the temperature, so that the measured value of the pressure reaches a prescribed pressure value which is set in advance.

2. The waste heat recovery system according to claim 1, wherein said at least one device for stopping the operation is a brake which applies a load to a rotating shaft of said second expander.

\* \* \* \* \*